United States Patent
Han et al.

(10) Patent No.: US 10,110,378 B2
(45) Date of Patent: Oct. 23, 2018

(54) APPARATUS AND METHOD FOR STABLIZING QUANTUM CRYPTOGRAPHY SYSTEM

(71) Applicant: KOREA INSTITUTE OF SCIENCE AND TECHNOLOGY, Seoul (KR)

(72) Inventors: Sang Wook Han, Seoul (KR); Sung Wook Moon, Seoul (KR); Yong-Su Kim, Seoul (KR); Il Young Kim, Seoul (KR); Byungkwon Park, Seoul (KR)

(73) Assignee: Korea Institute of Science and Technology, Seoul (KR)

( * ) Notice: Subject to any disclaimer, the term of this patent is extended or adjusted under 35 U.S.C. 154(b) by 226 days.

(21) Appl. No.: 15/176,428

(22) Filed: Jun. 8, 2016

(65) Prior Publication Data
US 2017/0099139 A1    Apr. 6, 2017

(30) Foreign Application Priority Data
Jun. 8, 2015   (KR) .................. 10-2015-0080595

(51) Int. Cl.
*H04L 9/08* (2006.01)
*B82Y 20/00* (2011.01)
*H04B 10/70* (2013.01)

(52) U.S. Cl.
CPC .......... *H04L 9/0852* (2013.01); *H04L 9/0858* (2013.01); *B82Y 20/00* (2013.01); *H04B 10/70* (2013.01)

(58) Field of Classification Search
CPC ...... H04L 9/0852; H04L 9/0858; H04B 10/70
See application file for complete search history.

(56) References Cited

U.S. PATENT DOCUMENTS

| | | |
|---|---|---|
| 6,438,234 B1 | 8/2002 | Gisin et al. |
| 7,492,904 B2 | 2/2009 | Young |
| 7,577,254 B2 | 8/2009 | Vig et al. |
| 7,639,947 B2 | 12/2009 | Luo et al. |
| 8,116,636 B2 | 2/2012 | Youn et al. |
| 8,477,939 B2 | 7/2013 | Youn et al. |

(Continued)

FOREIGN PATENT DOCUMENTS

| | | |
|---|---|---|
| JP | 2007-532041 A | 11/2007 |
| JP | 2013-114366 A | 6/2013 |

(Continued)

OTHER PUBLICATIONS

Zhang, H. et al., "A real-time QKD system based on FPGA," Journal of Lightwave Technology, vol. 30.20, 2012 (7 pages).

*Primary Examiner* — Matthew Smithers
*Assistant Examiner* — Alexander R Lapian
(74) *Attorney, Agent, or Firm* — NSIP Law

(57) ABSTRACT

Disclosed is a method for stabilizing a quantum cryptography system, which includes: determining whether the quantum cryptography system operates in a stabilized state, on the basis of a bit error rate or a key rate of the quantum cryptography system; and readjusting an arrival time of a gate pulse or a laser operation time so that an arrival time of a single photon for a photon detector is aligned with the arrival time of the gate pulse, when the quantum cryptography system does not operate in a stabilized state. Here, the quantum cryptography system may be a two-way quantum cryptography system.

14 Claims, 14 Drawing Sheets

(56) References Cited

U.S. PATENT DOCUMENTS

| | | | | |
|---|---|---|---|---|
| 2006/0239463 A1* | 10/2006 | Young | .................... | H04B 10/70 380/278 |
| 2007/0133799 A1* | 6/2007 | Vig | ........................ | H04B 10/70 380/256 |
| 2009/0022326 A1* | 1/2009 | Vig | ........................ | H04B 10/70 380/285 |
| 2009/0190759 A1* | 7/2009 | Peev | .................... | H04L 9/0858 380/256 |
| 2013/0016835 A1* | 1/2013 | Zbinden | ................ | H04B 10/70 380/255 |

FOREIGN PATENT DOCUMENTS

| | | |
|---|---|---|
| KR | 10-2008-0052234 A | 6/2008 |
| KR | 10-1003886 B1 | 12/2010 |

\* cited by examiner

APPARATUS AND METHOD FOR STABLIZING QUANTUM CRYPTOGRAPHY SYSTEM

CROSS-REFERENCE TO RELATED APPLICATION

This application claims priority to Korean Patent Application No. 10-2015-0080595, filed on Jun. 8, 2015, and all the benefits accruing therefrom under 35 U.S.C. § 119, the contents of which in its entirety are herein incorporated by reference.

BACKGROUND

1. Field

The present disclosure relates to a quantum cryptography field. More particularly, the present disclosure relates to an apparatus and method for stabilizing a quantum cryptography system, for maintaining optimal system performance.

[Description about National Research and Development Support]

This study was supported by the Ministry of Science, ICT and Future Planning, as Project No. 1711022147.

2. Description of the Related Art

A quantum cryptography system allows two separated stations, namely a sender (Alice) and a receiver (Bob), to distribute one-time pad keys safely. In the quantum cryptography system, quantum key distribution (QKD) uses a weak light signal (for example, single photon) sent through a quantum channel, which has a relation with sharing of a key between the sender (Alice) and the receiver (Bob). At this time, the stability of key distribution is based on a quantum mechanics principle, defining that, if any quantum system in an unstable state is measured, the unstable state will be corrected. As a result, if a pirate listener (Eve) attempts to disturb or measure a quantum signal, an error occurs at the sending signal, thereby revealing the presence of a private listener.

The quantum cryptography system should align various variables according to time and maintain the arrangement in order to optimize system performance. For example, in order to detect a single photon at an expected photon arrival time, the quantum cryptography system should transmit a gate pulse for gating a photon detector at a time suitable for the photon detector to synchronize the photon arrival timing and the photon detection timing. In other case, an operation time of laser pulse may also be adjusted to synchronize the photon arrival timing and the photon detection timing.

However, this timing is drifted due to various environmental factors (for example, a change of a light path caused by shrinkage of an optical fiber due to the temperature change of an actual environment), which deteriorates a photon count. As a result, a transmission rate and a key distribution rate of the quantum cryptography system are reduced, and a bit error rate (BER) increases, thereby deteriorating system performance. Therefore, if the system performance deteriorates, the quantum cryptography system should automatically arrange the arrival time or the like to a photon detector of the gate pulse to stabilize the system, so that the system may operate with optimal performance again.

RELATED LITERATURES

Patent Literature (Patent Literature 1) Korean Unexamined Patent Publication KR 10-2008-0052234

SUMMARY

The present disclosure is directed to providing an apparatus and method for stabilizing a quantum cryptography system, which adjusts a gate pulse of a photon detector or a laser operation time to synchronize a photon arrival time and a photon detector operation time, when the quantum cryptography system does not operate in a stabilized state, and thus maintains optimal system performance.

In one aspect, there is provided a method for stabilizing a quantum cryptography system, comprising: determining whether the quantum cryptography system operates in a stabilized state, on the basis of a bit error rate or a key rate of the quantum cryptography system; and readjusting an arrival time of a gate pulse or a laser operation time so that an arrival time of a single photon for a photon detector is aligned with the arrival time of the gate pulse, when the quantum cryptography system does not operate in a stabilized state.

In another aspect, there is provided an apparatus for stabilizing a quantum cryptography system, comprising at least one control unit, wherein the control unit executes: determining whether the quantum cryptography system operates in a stabilized state, on the basis of a bit error rate or a key rate of the quantum cryptography system; and readjusting an arrival time of a gate pulse for a photon detector so that an arrival time of a single photon for the photon detector is aligned with the arrival time of the gate pulse, when the quantum cryptography system does not operate in a stabilized state.

In an embodiment, the quantum cryptography system may be a plug-and-play quantum cryptography system.

In an embodiment, there is provided a method for stabilizing a quantum cryptography system which communicates with a plurality of sending stations, the method comprising: determining whether the quantum cryptography system operates in a stabilized state, on the basis of a bit error rate or a key rate of the quantum cryptography system; and controlling a laser operation time of each sending station independently, when the quantum cryptography system does not operate in a stabilized state.

In an embodiment, the controlling of a laser operation time of each sending station independently may include arranging each laser operation time on the basis of a maximum counting point of a photon detector, in a state where a gate pulse time of the photon detector is fixed.

In an embodiment, there is provided an apparatus for stabilizing a quantum cryptography system which communicates with a plurality of sending stations, the apparatus comprising at least one control unit, wherein the control unit executes: determining whether the quantum cryptography system operates in a stabilized state, on the basis of a bit error rate or a key rate of the quantum cryptography system; and controlling a laser operation time of each sending station independently, when the quantum cryptography system does not operate in a stabilized state.

In an embodiment, the control unit may arrange each laser operation time on the basis of a maximum counting point of a photon detector, in a state where a gate pulse time of the photon detector is fixed.

According to the present disclosure, the apparatus for stabilizing a quantum cryptography system may maintain the system in a stabilized state by adjusting an arrival time of a detector gate pulse and thus determining an optimal arrival time.

According to the present disclosure, the apparatus for stabilizing a quantum cryptography system may stabilize the system rapidly and accurately by determining a reference arrival time roughly in a relatively broad time range and determining an optimal arrival time minutely in a relatively narrow time range on the basis of the reference arrival time.

According to the present disclosure, the apparatus for stabilizing a quantum cryptography system may prevent the detector gate pulse or the laser operation time from being unnecessarily readjusted, by rearranging a phase modulation value prior to adjusting the arrival time of the detector gate pulse, and verifying whether the system operates in a stabilized state again, on the basis of the readjusted phase modulation value.

DETAILED DESCRIPTION

Figure 1:
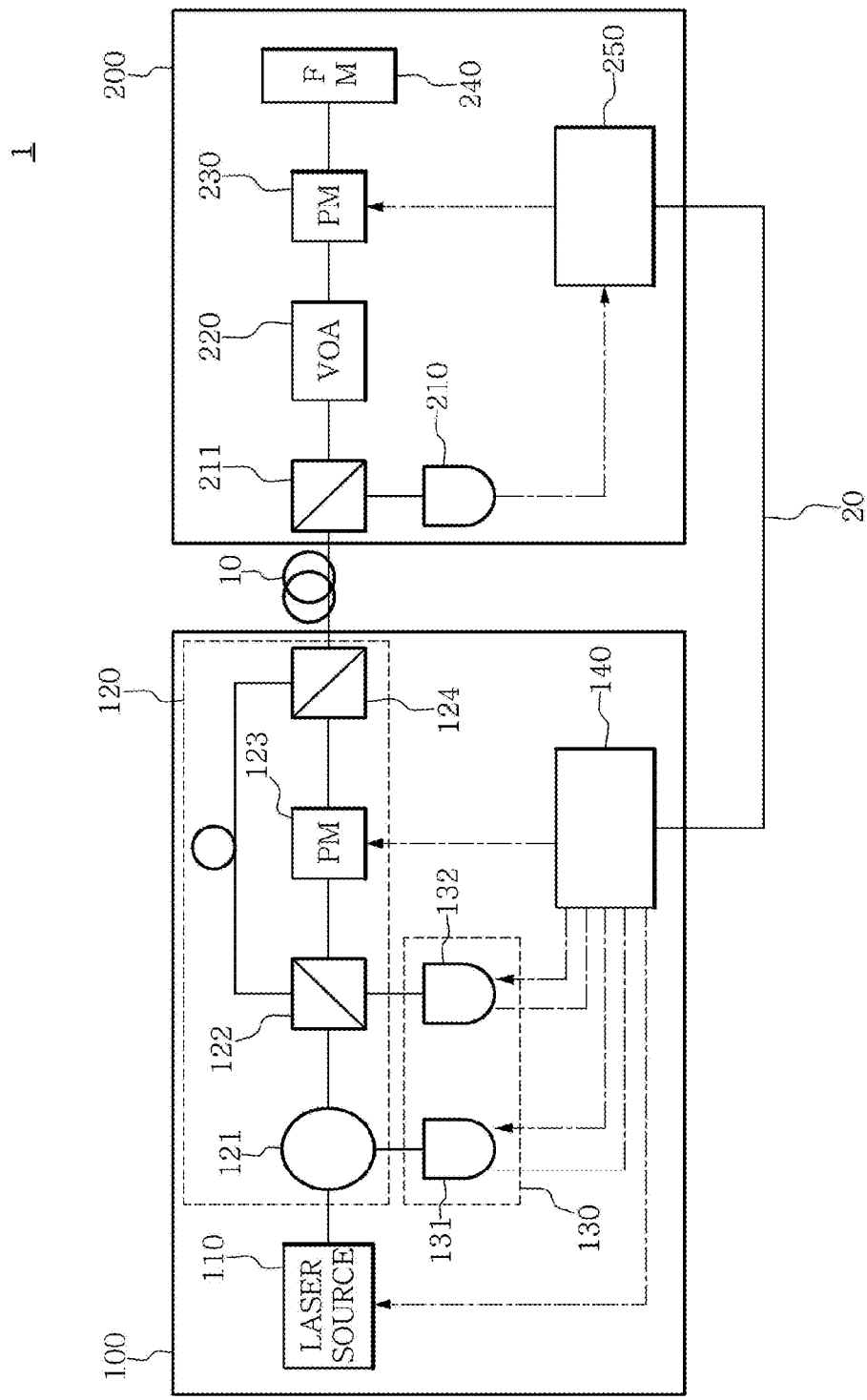
FIG. 1 is a diagram showing an exemplary quantum cryptography system according to an embodiment of the present disclosure.

Hereinafter, embodiments will be described in detail with reference to the accompanying drawings and contents depicted in the accompanying drawings, but the scope of the present disclosure is not limited to the embodiments.

Terms used in the present disclosure have been selected from general terms widely used in the art in consideration of their functions, but such terms may be changed according to an intention of a technician in the art or due to appearance of a new technology. In addition, in some cases, terms have been created by the applicant, and these terms will be explained in the present disclosure. Therefore, the terms used in the present disclosure are not just simple names but should be interpreted on the basis of substantive meanings of the terms and the overall contents of the present disclosure.

In the present disclosure, a quantum cryptography system may employ various kinds of quantum cryptography systems which utilize polarized encoding or phase encoding and use at least one single photon detector. For example, in the present disclosure, the quantum cryptography system may be a one-way quantum cryptography system, but desirably, the quantum cryptography system may be a two-way or plug-and-play quantum cryptography system.

Here, the one-way quantum cryptography system means a quantum cryptography system in which Alice randomly encodes polarization or phase of a photon signal and Bob randomly measures the polarization or phase of the photon signal. The one-way quantum cryptography system has an advantage in a rapid key distribution rate, but in order to stabilize the system, it is required to control three control elements, namely phase control of an interferometer, polarization control for correcting a polarization drift, and control for synchronizing a photon arrival time and a gate pulse arrival time for a photon detector.

Here, the two-way or plug-and-play quantum cryptography system may be a quantum cryptography system in which, when a light signal initiated from Bob is send through Alice to Bob again, the sent photon signal is measured by a photon detector. The two-way quantum cryptography system has a low key distribution rate in comparison to the one-way quantum cryptography system but has an advantage in that polarization or phase is automatically arranged. Therefore, in order to stabilize the two-way quantum cryptography system, it is required to control only one control element, namely control for synchronizing a photon arrival time and a gate pulse arrival time for a photon detector.

In the present disclosure, an apparatus for stabilizing a quantum cryptography system means an apparatus for performing automatic arrangement in relation to a photon detector of the quantum cryptography system so that the quantum cryptography system may operate stably while keeping optimal performance. For example, the stabilizing apparatus means an apparatus for automatically adjusting an arrival time of a gate pulse sent to the photon detector of the quantum cryptography system or a laser operation time so that the quantum cryptography system may stably operate while keeping optimal performance.

Hereinafter, for convenience, the stabilizing apparatus and method will be described based on a case where the quantum cryptography system is a two-way quantum cryptography system, but this is just for exemplarily explaining the apparatus and method for stabilizing a quantum cryptography system according to the present disclosure, and the scope of the present disclosure is not restricted or limited thereto.

FIG. 1 is a diagram showing an exemplary quantum cryptography system according to an embodiment of the present disclosure. Referring to FIG. 1, the system 1 is a two-way quantum cryptography system, which includes Bob 100 serving as a sending/receiving station and Alice 200 serving as a sending station. Hereinafter, these stations will be called Bob 100 and Alice 200, respectively. In addition, in an embodiment of the present disclosure, a plurality of Alice 200 may be provided. In other words, a plurality of Alice 200 may be connected to a single Bob 100 and communicate with the same. FIG. 1 shows just one Alice 200 for convenient explanation.

The Bob 100 may include a laser source 110, an optical system 120, a photon detection unit 130 and a first control unit 140.

The laser source 110 may generate a light pulse. In addition, the laser source 110 may be connected to the optical system 120 and send the generated light pulse to the optical system 120.

The optical system 120 may receive a light pulse and divide each pulse into two time-multiplexed pulses. For example, the optical system 120 may divide each pulse into two time-multiplexed pulses by inputting the generated light pulse into a beam splitter 122 through an optical circulator 121, dividing each pulse by using the beam splitter 122, and allowing the divided pulses to move optical paths of different lengths.

In addition, the optical system 120 may phase-modulate a single phase of the two time-multiplexed pulses by using a first phase modulator 123. In an embodiment, the first phase modulator 123 may be located on a lagged path, without being limited thereto. In addition, the optical system 120 may be connected to a quantum channel 10 to send the divided pulses to Alice 200. For example, the optical system 120 may send both divided pulses to the Alice 200 by using a polarization beam splitter 124 connected to the quantum channel 10.

The photon detection unit 130 is connected to the optical system 120 and may detect a single photon received from the Alice 200. In an embodiment, the photon detection unit 130 may include a single photon detector or a plurality of photon detectors 131, 132. Here, the photon detector may be a single photon detector (for example, an avalanche photo diode (APD)).

The first control unit 140 may control each component of the Bob 100 described above. The first control unit 140 may send a control signal to each component to activate the component. For example, the first control unit 140 may send a gate pulse, which is a control signal for gating the photon detectors 131, 132, to the photon detection unit 130. In addition, the first control unit 140 may send a control signal to the laser source 110 so that the laser source 110 generates a light pulse, and may also send a control signal to the first phase modulator 123 so that the first phase modulator 123 phase-modulates the light pulse at a suitable timing.

The Alice 200 may include a photo detector 210, a second phase modulator 230, a variable optical attenuator 220, a Faraday mirror 240 and a second control unit 250.

The photo detector 210 may detect a received light signal and send the detection result to the second control unit 250. For example, the photo detector 210 may detect light signals divided by the beam splitter 211 and send the detection result to the second control unit 250. The sent detection result may be used by the second control unit 250 to generate a timing signal for determining a phase modulation timing of the second phase modulator 230.

When any one of time-divided pulses passes through the second phase modulator 230, the second phase modulator 230 may phase-modulate the pulse to generate a phase-modulated pulse. The phase modulation may be performed by the second control unit 250 on the basis of the detection result of the photo detector 210.

The variable optical attenuator 220 may attenuate each time-divided pulse to a level of a single photon. In addition, the Faraday mirror 240 may reflect each pulse passing through the variable optical attenuator 220 and the second phase modulator 230 to send the pulse back to the second phase modulator 230 again.

The second control unit 250 may control each component of the Alice 200 described above. The second control unit 250 may send a control signal to each component to activate the component, similar to the first control unit 140. For example, the second control unit 250 may control the second phase modulator 230 to phase-modulate any one of the pulses and also control the light pulse to return to the Bob 100.

The first and second control units 140, 250 may be connected through a synchronization link 20 to synchronize operations of the Alice 200 and the Bob 100. In particular, when a quantum key is exchanged between the Alice 200 and the Bob 100, operations of the laser source 110, the phase modulators 123, 230 and the photon detection unit 130 may be controlled and adjusted by the control units 140, 250. Therefore, in this embodiment, it may be considered that the control units 140, 250 are configured as a single control unit for the quantum cryptography system 1. In addition, the control units 140, 250 may be connected to a separate computing device having a process in a wired or wireless way, configured as a single control unit included in the computing device, or regarded as being identical to the computing device.

Hereinafter, exemplarity operations of the system 1 will be described in detail with reference to FIG. 1. The operations of the system 1 described below are just examples, and it is obvious to those having ordinary skill in the art that the system 1 may operate in various ways.

First, a light pulse may be generated by the laser source 110 of the Bob 100, and the light pulse generated by the optical system 120 may be divided into two separate pulses P1, P2. At this time, the first phase modulator 123 may be gated so that the pulse passes without being phase-modulated. Each of the pulses P1, P2 may be transmitted to the Alice 200 through the quantum channel 10.

Next, each of the pulses P1, P2 may be divided by the beam splitter 211 of the Alice 200, and one of the divided pulses may be detected by the photo detector 210. At this time, the detection result of the photo detector 210 may be provided to the second control unit 250 so that the second control unit 250 may operate the second phase modulator 230 when the other divided pulse reaches the phase modulator. After that, each of the pulses P1, P2 may be reflected by the Faraday mirror 240 after passing through the variable optical attenuator 220 and the second phase modulator 230, and thus be sent back to the second phase modulator 230 again.

Next, when any one of the pulses P1, P2 passes, the second phase modulator 230 may phase-modulate the pulse (for example, P1) to generate a phase-modulated pulse (for example, P1'). The phase modulation may be performed by the second control unit 250 on the basis of the detection result of the photo detector 210. After that, the pulses P1', P2 may be attenuated to a level of a single photon by the variable optical attenuator 220.

Next, each pulse may be sent to the Bob 100 again and return to the first phase modulator 123 of the optical system 120. At this time, the first phase modulator 123 may modulate the other non-modulated pulse (for example, the pulse P2) randomly by using one of selective phase modulations to generate a phase-modulated pulse (for example, P2'). This phase modulation may be performed by the first control unit 140.

Next, the phase-modulated pulses P1', P2' are coupled to generate a coupled pulse P3, and the coupled pulse P3 may be detected by each of the photon detectors 131, 132 of the photon detection unit 130. At this time, each photon detector may be gated (activated) only during a time when the pulse has the same width as a gate signal transmitted by the first control unit 140 to detect the pulse.

In an embodiment, assuming that the photon detection unit 130 includes a plurality of photon detectors 131, 132, if the coupled pulse P3 arrives at any one of the photon detectors at the time when the photon detectors 131, 132 are gated, the photon detection unit 130 may output a signal corresponding to relative phases given to the pulses P1, P2 by the phase modulators to the first control unit 140. For example, depending on whether one of the photon detectors 131, 132 is constructive interference or destructive interference, an interfered pulse P3 may be received. At this time, if the given phase is not constructive or destructive, the pulse P3 may arrive at any one of the photon detectors 131, 132 with the same probability.

If a desired number of photon signals are exchanged between the Bob 100 and the Alice 200 through the above process, the system 1 may derive a quantum cryptography key by using standard techniques (for example, BB84 protocol, or the like) for quantum cryptography. For example, the Alice 200 and the Bob 100 may publicly compare measurement bases, and a key may be derived by maintaining only a measurement result corresponding to the same measurement base. By doing so, a shifted key may be formed.

In addition, the order of bit locations may be rearranged at the shifted key, and the rearranged key may be divided into blocks. The Alice 200 and the Bob 100 may perform a parity test to each block, and may also distinguish and discard an error bit. This process may be repeated until the number of errors of the shifted key is sufficiently decreased or eliminated, thereby ensuring a safe quantum cryptography key. In addition, this process may allow a bit error rate (BER, or Quantum Bit Error Rate: QBER) or a key rate (KR) to be determined.

In the above process, if a third party (for example, Eve) attempts to wiretap or illegally listen to the light pulse, a bit error occurs at the quantum cryptography key due to a quantum property of the photon, but such a bit error may also occur due to the system 1 when the system 1 is not suitably corrected. For example, if the gating timing of the photon detector is not optimal, the pulse may not be detected at a suitable time, which may increase BER.

Hereinafter, when the system 1 does not operate in a stabilized state since a photon arrival time and a gate pulse arrival time for the photon detectors 131, 132 are different due to the change of an optical path caused by shrinkage and expansion of an optical fiber according to a temperature change of an actual environment, the system 1 may operate in a stabilized state with optimal performance by rearranging the arrival time of the gate pulse. This will be described in detail.

Figure 2:
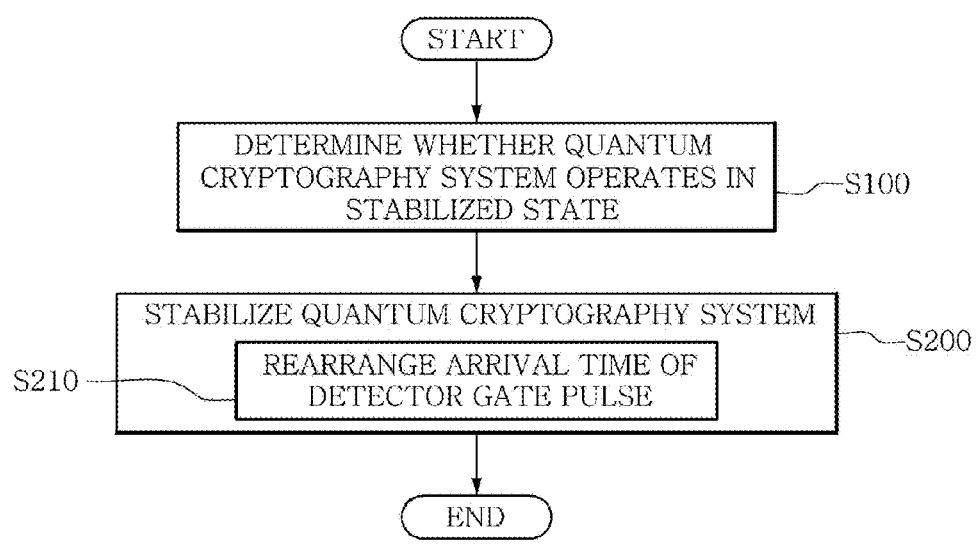
FIG. 2 is a flowchart for illustrating a method for stabilizing a quantum cryptography system according to an embodiment of the present disclosure.

FIG. 2 is a flowchart for illustrating a method for stabilizing a quantum cryptography system according to an embodiment of the present disclosure. This stabilizing method may be performed by at least one control unit included in the quantum cryptography system. For example, as described above with reference to FIG. 1, the stabilizing method may be performed by at least one of the first control unit and the second control unit, or by a single control unit controlling both Bob and Alice. Hereinafter, it may be expressed that the control unit controls the stabilizing apparatus or at least one component included in the stabilizing apparatus, and the control unit and the stabilizing apparatus may be explained as the same component.

Referring to FIG. 2, the method for stabilizing a quantum cryptography system includes determining whether the quantum cryptography system operates in a stabilized state (S100) and stabilizing the quantum cryptography system (S200). In addition, the process of stabilizing the quantum cryptography system (S200) may include readjusting an arrival time of a detector gate pulse or a laser operation time (S210). Here, the stabilized state means a state where the performance (key distribution rate or the like) of the quantum cryptography system is maintained over a certain level.

In an embodiment, the stabilizing apparatus may determine whether the system operates in a stabilized state, on the basis of a bit error rate (BER) or a key rate (KR) obtained during the quantum cryptography key distributing process. For example, the stabilizing apparatus may determine that the system does not operate in a stabilized state, when the bit error rate is equal to or greater than a preset first threshold or the key rate is equal to or smaller than a preset second threshold. If the system does not operate in a stabilized state, the stabilizing apparatus may perform a stabilizing process as follows.

In an embodiment, if the system does not operate in a stabilized state, in order to stabilize the system, the stabilizing apparatus may rearrange an arrival time of a gate pulse for a photon detector (hereinafter, a detector gate pulse) or a laser operation time. In other words, the stabilizing apparatus may rearrange a preset arrival time of the detector gate pulse or a preset laser operation time to determine an optimal arrival time at which the photon arrival timing and the photon detection timing are substantially identical, thereby stabilizing the system. For example, the stabilizing apparatus may stabilize the system by rearranging an arrival time of a detector gate pulse or a laser operation time to determine an optimal arrival time, so that an arrival time of a single photon for the photon detector is aligned (for example, synchronized) with the arrival time of the detector gate pulse. Here, the arrival time of the single photon and the arrival time of the detector gate pulse are aligned not only when the arrival time of the single photon and the arrival time of the detector gate pulse are aligned to be perfectly coincident but also when both arrival times are substantially aligned within a certain error range.

In an embodiment, the stabilizing apparatus may perform the stabilizing process by using a signal generator based on a field programmable gate array (FPGA). In this case, the FPGA-based signal generator may include a serial converter module (a serializer).

In the present disclosure, the detector gate pulse means a pulse for gating a photon detector to which the pulse is sent. The operation of the photon detector may correspond to a width of the detector gate pulse. In more detail, the photon detector may initiate the operation at a front end (for example, an ascending edge) of the detector gate pulse reaching the photon detector and end the operation at a rear end (for example, a descending edge), to detect a single photon during a width (or, a duration time) (W) of the detector gate pulse.

Figure 3:
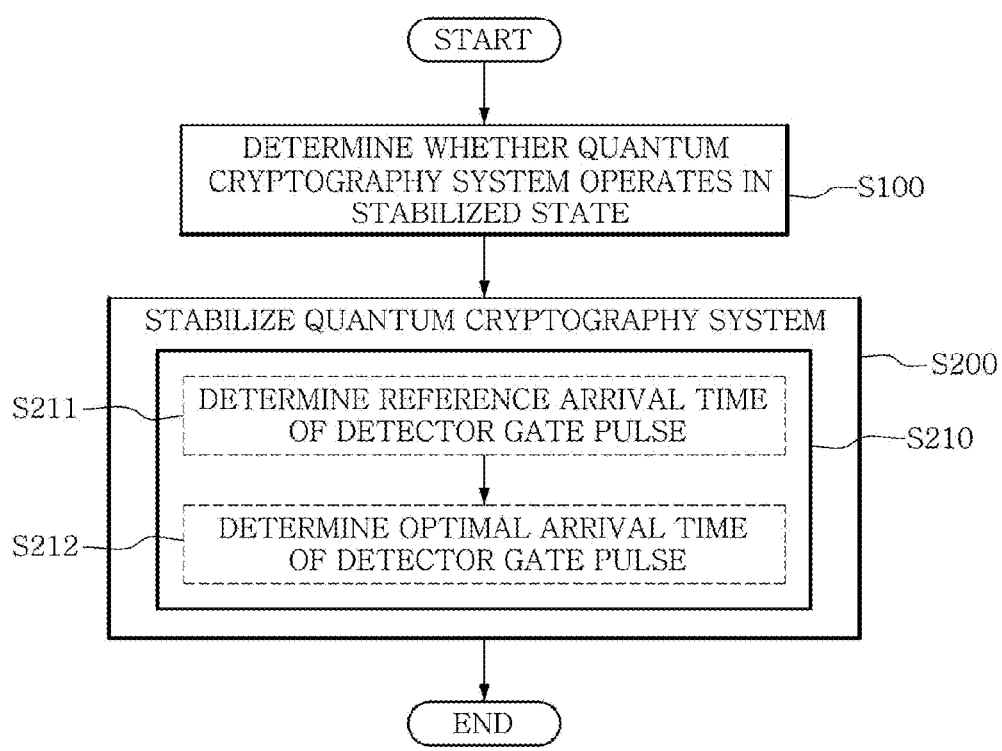
FIG. 3 is a flowchart for illustrating a process of stabilizing a quantum cryptography system in the method for stabilizing a quantum cryptography system according to an embodiment of the present disclosure.

FIG. 3 is a flowchart for illustrating a process of stabilizing a quantum cryptography system in the method for stabilizing a quantum cryptography system according to an embodiment of the present disclosure.

Referring to FIG. 3, the process of rearranging an arrival time of a detector gate pulse (S210) may include determining a reference arrival time of the detector gate pulse (S211) and determining an optimal arrival time of the detector gate pulse or a laser operation time (S212).

Here, the reference arrival time is an arrival time (optimization initiation time) serving as a reference for determining an optimal arrival time of the detector gate pulse or an optimal laser operation time, and may be, for example, an arrival time of the detector gate pulse, which corresponds to a time when a photon count measured at the photon detector is equal to or greater than a threshold count. In addition, the optimal arrival time is an optimal arrival time of the detector gate pulse or an optimal laser operation time, which allows the system to operate in a stabilized state, and may be, for example, an arrival time of the detector gate pulse or an optimal laser operation time, which corresponds to a time when a photon count measured at the photon detector is maximal.

In an embodiment, the stabilizing apparatus may determine a reference arrival time of the detector gate pulse or a laser operation time within a first time range and may determine an optimal arrival time of the detector gate pulse or an optimal laser operation time within a second time range including a reference arrival time. At this time, the second time range may be a time range smaller than the first time range or equal to the first time range.

In an embodiment, the stabilizing apparatus may determine the reference arrival time on the basis of a photon count measured as the arrival time of the detector gate pulse or the laser operation time is changed as much as a first time interval within the first time range, and the optimal arrival time may be determined on the basis of a photon count measured as the arrival time of the detector gate pulse or the laser operation time is changed as much as a second time interval within the second time range. Here, the second time interval may be smaller than the first time interval or equal to the first time interval.

By doing so, the stabilizing apparatus may determine the reference arrival time roughly within a relatively wide time range and determine the optimal arrival time minutely within a relatively narrow time range on the basis of the reference arrival time.

Figure 4:
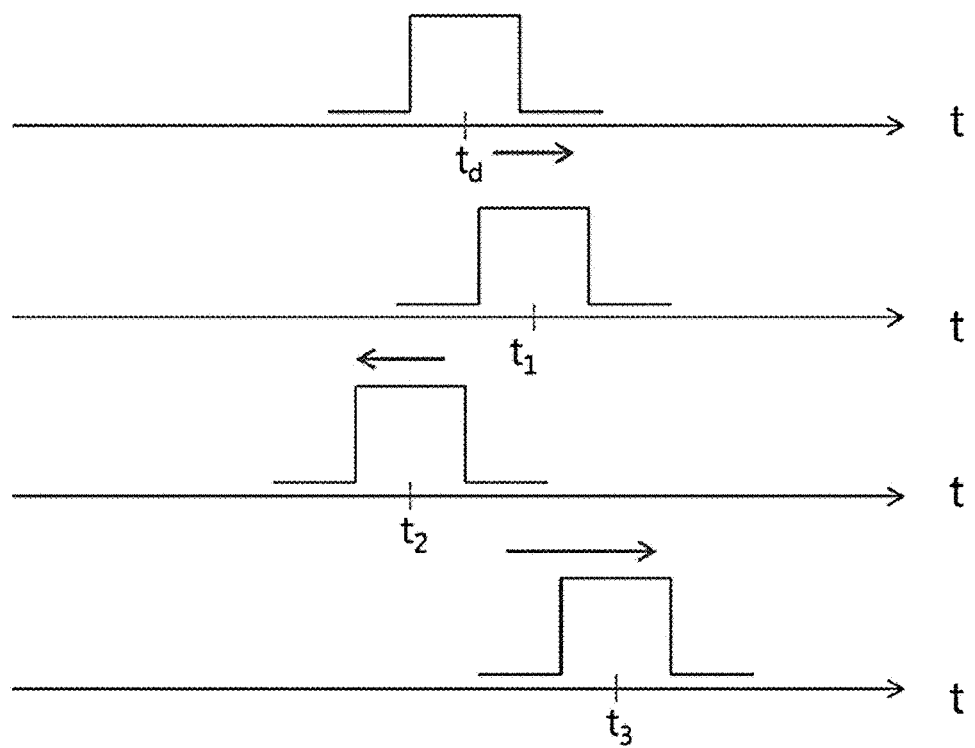
FIG. 4 is a diagram for illustrating a process of determining a reference arrival time, in the process of stabilizing a quantum cryptography system according to an embodiment of the present disclosure.

FIG. 4 is a diagram for illustrating a process of determining a reference arrival time, in the process of stabilizing a quantum cryptography system according to an embodiment of the present disclosure.

Referring to FIG. 4, the process of determining a reference arrival time (S211) will be described in more detail. Here, the stabilizing apparatus may measure a photon count through the photon detector after lagging the arrival time or the laser operation time as much as a first time from a preset default time ($t_d$). If the measured photon count is equal to or greater than a threshold count, the stabilizing apparatus may determine the corresponding time (time ($t_1$) lagged from the default time as much as the first time) as the reference time and ends the reference time determining process. If the measured photon count is smaller than the threshold count, the stabilizing apparatus may lead the operation time as much as a second time from the default time and then measure the photon count again. In this case, the second time may be identical to the first time.

If the measured photon count is equal to or greater than the threshold count, the stabilizing apparatus may determine the corresponding time (time ($t_2$) leading from the default time as much as the second time) as the reference time and ends the reference time determining process. If the measured photon count is smaller than the threshold count, the stabilizing apparatus may measure a photon count again after lagging the operation time as much as a third time from the default time and determines whether the measured photon count is equal to or greater than the threshold count. Here, the third time may be a time greater than the first time, for example, a double time of the first time.

If the measured photon count is equal to or greater than the threshold count, the stabilizing apparatus may determine the corresponding time (time ($t_3$) lagged from the default time as much as the third time) as the reference time, and if not, the stabilizing apparatus may lead the arrival time of the detector gate pulse or the laser operation time as much as a fourth time from the default time and then measure the photon count again. In this case, the fourth time may be identical to the third time.

As described above, the stabilizing apparatus may lead or lag the arrival time of the detector gate pulse or the laser operation time as much as a preset time interval and determine the reference time as described above on the basis of a photon count measured at the changed time by the photon detector. However, this is just an example, and the embodiment of the present disclosure is not limited thereto. For example, the stabilizing apparatus may determine the reference time on the basis of photon counts measured while continuously lagging (increasing) the arrival time of the detector gate pulse or the laser operation time from a specific time as much as a preset time interval or may determine the reference time on the basis of photon counts measured while continuously leading (decreasing) the arrival time of the detector gate pulse or the laser operation time from a specific time as much as a preset time interval.

Figure 5A:
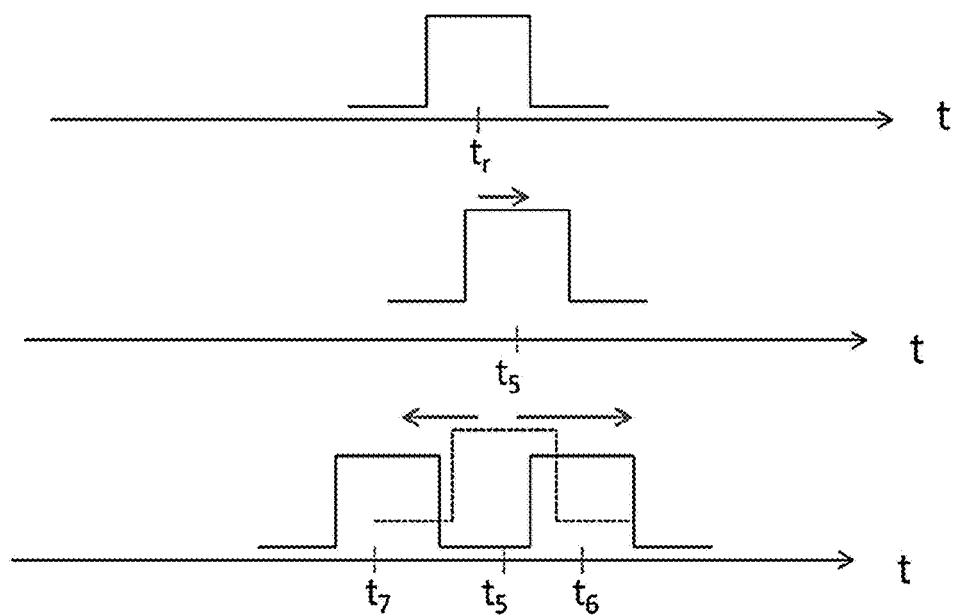
FIGS. 5A to 5C are diagrams for illustrating a process of determining an optimal arrival time, in the process of stabilizing a quantum cryptography system according to an embodiment of the present disclosure.
Figure 5B:
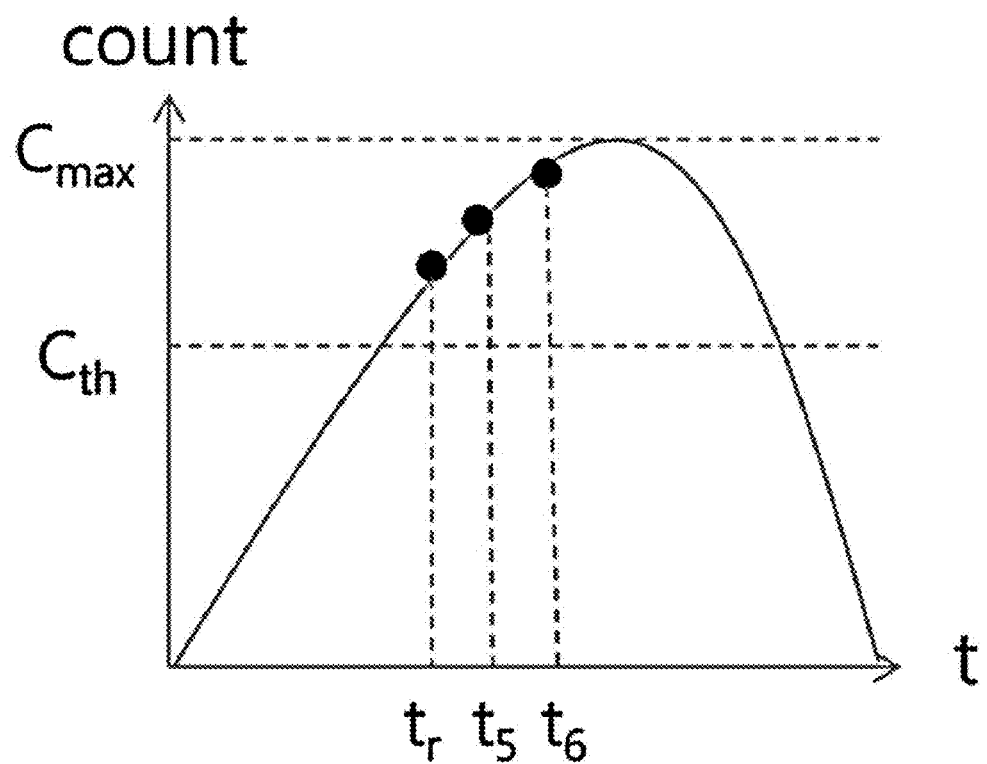
Figure 5C:
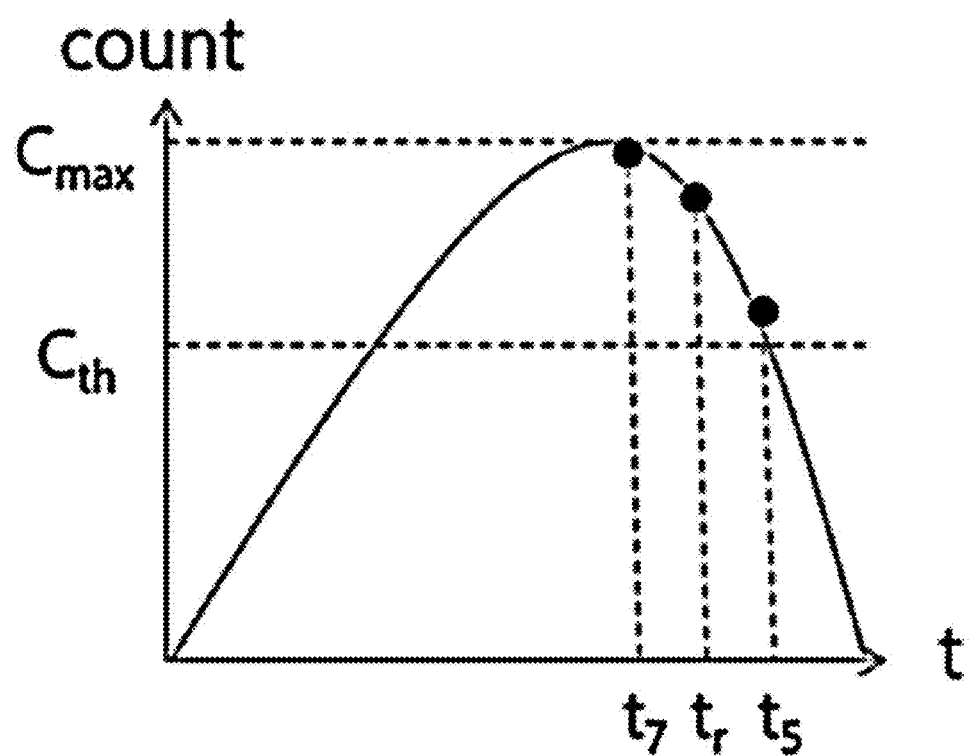

FIGS. 5A to 5C are diagrams for illustrating a process of determining an optimal arrival time, in the process of stabilizing a quantum cryptography system according to an embodiment of the present disclosure.

Referring to FIG. 5A, the process of determining an optimal arrival time (S212) will be described in more detail. Here, the stabilizing apparatus lags an operation time at an initiation time ($t_r$) as much as a fifth time and compare a first photon count measured at the changed operation time (for example, time ($t_5$) lagged from an initiation time as much as the fifth time) with a second photon count measured at an operation time (for example, initiation time ($t_r$)) measured by the photon detector before the above change. At this time, the initiation time may be the reference operation time. Here, the fifth time may be smaller than or equal to the first time.

As shown in FIG. 5B, if the first photon count is equal to or greater than the second photon count, the stabilizing apparatus may further lag the operation time from the changed operation time as much as a sixth time, compare a photon count measured at the operation time (for example, time ($t_6$) lagged from the initiation time as much as the fifth time and the sixth time) with a photon count measured at an operation time (for example, time ($t_5$) lagged from the initiation time as much as the fifth time) measured by the photon detector before the above change, and lag or lead the operation time according to the comparison result.

As shown in FIG. 5C, if the first photon count is smaller than the second photon count, the stabilizing apparatus may lead the operation time from the unchanged operation time as much as a seventh time, compare a photon count measured at the changed operation time (for example, time ($t_7$) lagged from the initiation time as much as the seventh time)

with a photon count measured at the operation time (for example, initiation time) measured by the photon detector before the above change, and lag or lead the operation time according to the comparison result. At this time, the sixth time and the seventh time may be identical to the fifth time. In other words, the adjusted time intervals may be consistent, without being limited thereto.

The stabilizing apparatus may repeat the above process until finding a time when the photon count becomes a maximum ($C_{max}$) within the second time range. By doing so, the stabilizing apparatus may obtain an operation time when the measured photon count is maximal, within the second time range, and determine the operation time as an optimal operation time.

Even though it has been described above that the stabilizing apparatus determines an optimal operation time by lagging an operation time from an initiation time as much as a preset time interval, this is just an example, and the present disclosure is not limited there. For example, the stabilizing apparatus may initiate a process of determining an optimal arrival time by leading an initiation or arrival time from an arrival or initiation time as much as a preset time interval. In another example, the stabilizing apparatus may initiate the process of determining an optimal operation time by lagging an initiation or arrival time to determine an optimal initiation or arrival time and initiates the process of determining an optimal operation time by leading the initiation or arrival time to determine an optimal operation time, thereby verifying this process. In addition, the stabilizing apparatus may initiate the process of determining an optimal operation time by leading an initiation or arrival time to determine an optimal initiation or arrival time and initiates the process of determining an optimal operation time by lagging the initiation or arrival time to determine an optimal operation time, thereby verifying this process. In other words, the stabilizing apparatus may further perform a verifying process.

Figure 6:
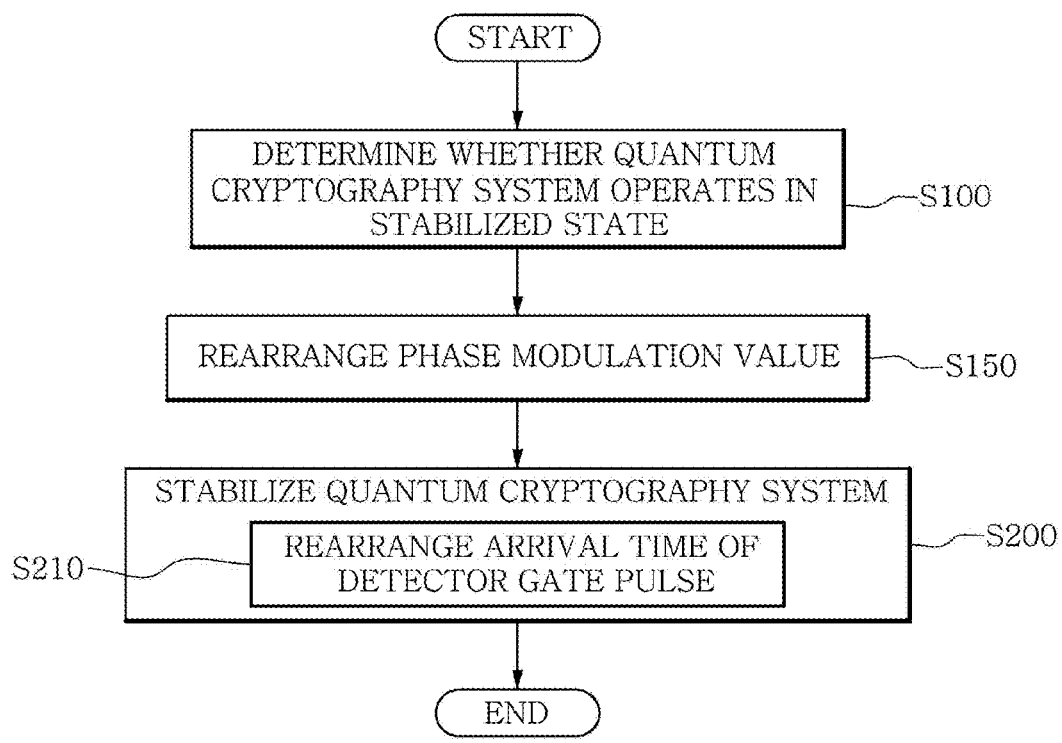
FIG. 6 is a flowchart for illustrating a method for stabilizing a quantum cryptography system according to another embodiment of the present disclosure.

FIG. 6 is a flowchart for illustrating a method for stabilizing a quantum cryptography system according to another embodiment of the present disclosure.

Referring to FIG. 6, if the quantum cryptography system includes a plurality of photon detectors (for example, two photon detectors), the stabilizing method may further include rearranging the phase modulation value of the phase modulator so that every photon detector may measure a single photon with substantially the same probability (S150), before the process of arranging the detector gate pulse or the laser operation time (S210). By doing so, the stabilizing apparatus may fix a count rate of each photon detector before rearranging the detector gate pulse or the laser operation time, which makes it possible to accurately determine a delay value of the detector gate pulse or the laser operation time with respect to the operation time.

In this case, in the process of determining whether the system operates in a stabilized state (S100), it may be further determined whether the system operates in a stabilized state on the basis of a key rate obtained after the phase modulation value is rearranged. For example, the stabilizing apparatus may determine whether a key rate (hereinafter, a rearranged key rate), obtained after the phase modulation value is rearranged, is equal to or greater than a first threshold. If the rearranged key rate is equal to or greater than the first threshold, the stabilizing apparatus may determine that the quantum cryptography system operates in a stabilized state, and if the rearranged key rate is smaller than the first threshold, the stabilizing apparatus may determine that the quantum cryptography system does not operate in a stabilized state.

By doing so, the stabilizing apparatus may verify again whether the system operates in a stabilized state before rearranging the arrival time of the detector gate pulse or the laser operation time, thereby preventing the detector gate pulse or the laser operation time from being unnecessarily readjusted.

Figure 7:
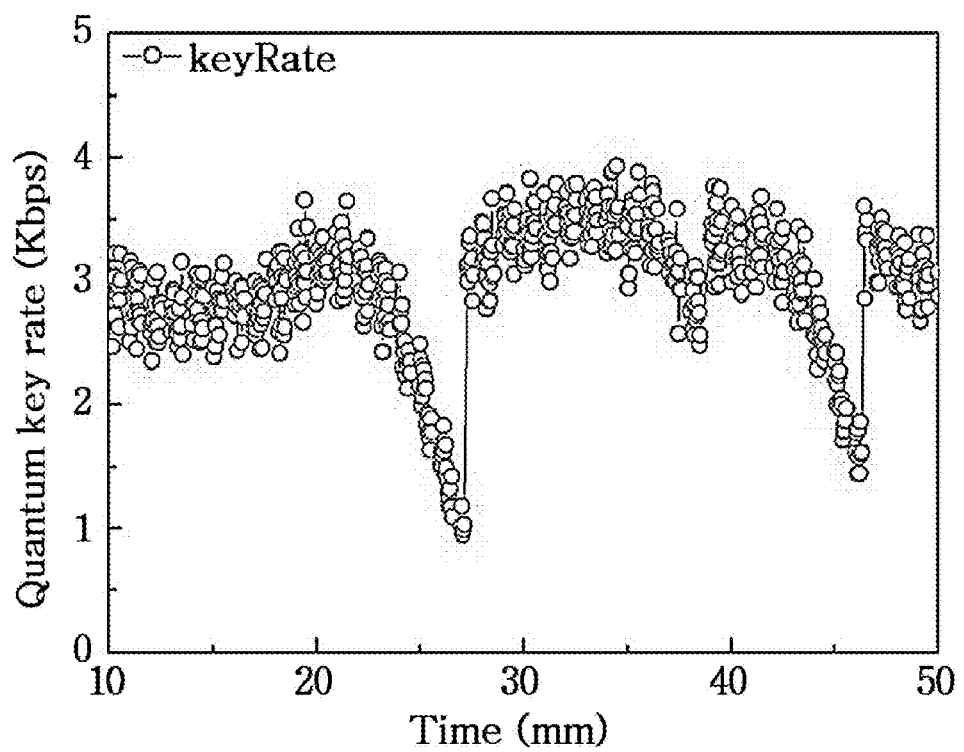
FIG. 7 is a diagram for illustrating that a key rate of the quantum cryptography system is maintained by applying a stabilizing apparatus according to an embodiment of the present disclosure.

FIG. 7 is a diagram for illustrating that a key rate of the quantum cryptography system is maintained by applying a stabilizing apparatus according to an embodiment of the present disclosure.

Referring to FIG. 7, if an optical path is changed due to a temperature change or the like while the system is operating in a stabilized state, the key rate of the system may be lowered below a threshold. In this case, the stabilizing apparatus may detect that the system does not operate in a stabilized state and stabilize the system again by rearranging the detector gate pulse or the laser operation time. As shown in the figure, the stabilizing apparatus may control the system to be continuously kept in a stabilized state as depicted in the figure by performing a stabilizing process including the detection of a stabilized state and the rearrangement of the detector gate pulse or the laser operation time in real time.

Figure 8:
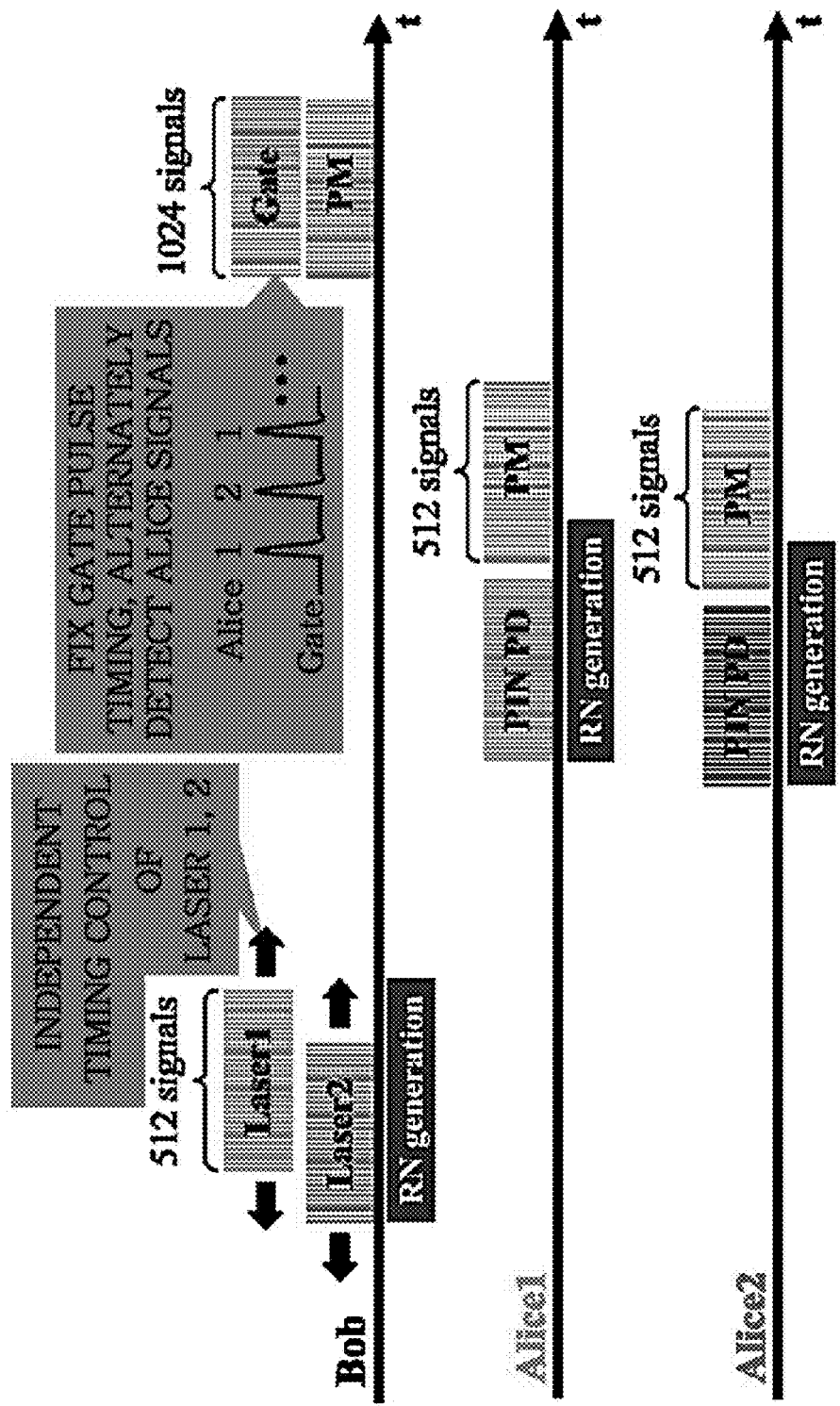
FIG. 8 is a timing diagram for illustrating that operation times of two time-multiplexed pulses are readjusted by a time adjuster, in the stabilizing apparatus according to an embodiment of the present disclosure.

FIG. 8 is a timing diagram for illustrating that operation times of two time-multiplexed pulses are readjusted by a time adjuster, in the stabilizing apparatus according to an embodiment of the present disclosure. Referring to FIG. 8, the apparatus for stabilizing a quantum cryptography system includes at least one control unit, and the control unit may executes: determining whether the quantum cryptography system operates in a stabilized state, on the basis of a bit error rate or a key rate of the quantum cryptography system; and controlling a laser operation time of each sending station independently, when the quantum cryptography system does not operate in a stabilized state. In other words, the control unit may control operation times of a pulse of Laser 1 and a pulse of Laser 2 independently. At this time, gate pulse timing may be fixed, and the photon detector may alternately detect signals received from every Alice (Alice 1, Alice 2).

In an embodiment, the control unit may adjust each laser operation time on the basis of a maximum counting point of the photon detector, in a state where the gate pulse time of the photon detector is fixed.

Figure 9:
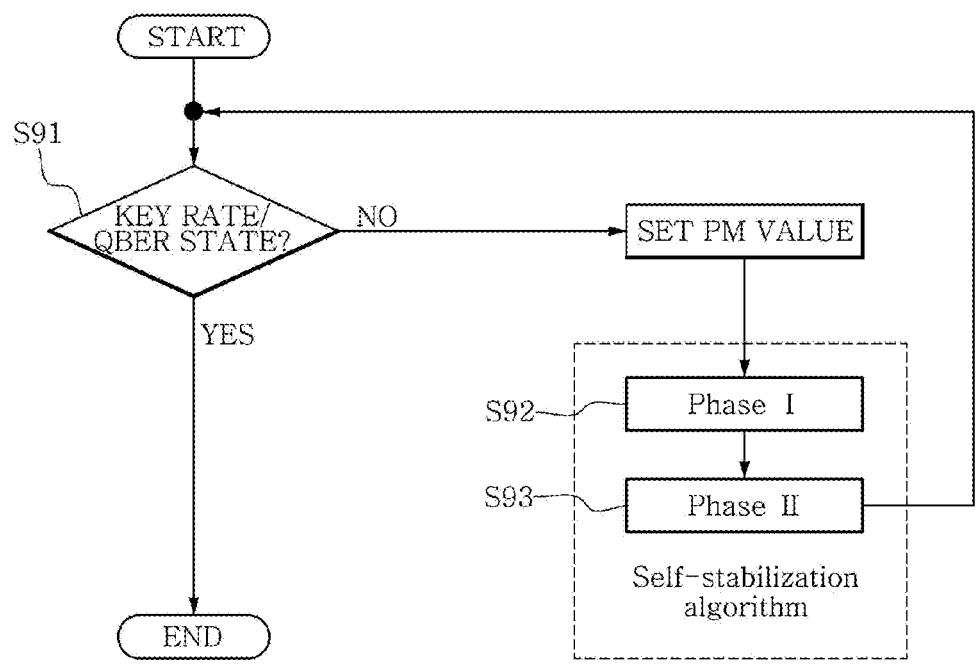
FIG. 9 is a diagram for illustrating a process of finding an optimal photon detector operation time when abnormality occurs, by monitoring the change of a key rate according to an embodiment.

FIG. 9 is a diagram for illustrating a process of finding an optimal photon detector operation time when abnormality occurs, by monitoring the change of a key rate according to an embodiment. Referring to FIG. 9, after determining whether the quantum cryptography system is in a stabilized state on the basis of a state of the key rate or the bit error rate(S91), if the quantum cryptography system is not in a stabilized state, in a state where a phase modulation (PM) value is set, a noise signal is determined at Phase 1(S92). After that, at Phase 2, the operation time is adjusted on the basis of the maximum counting point of the photon detector (S99).

Figure 10:
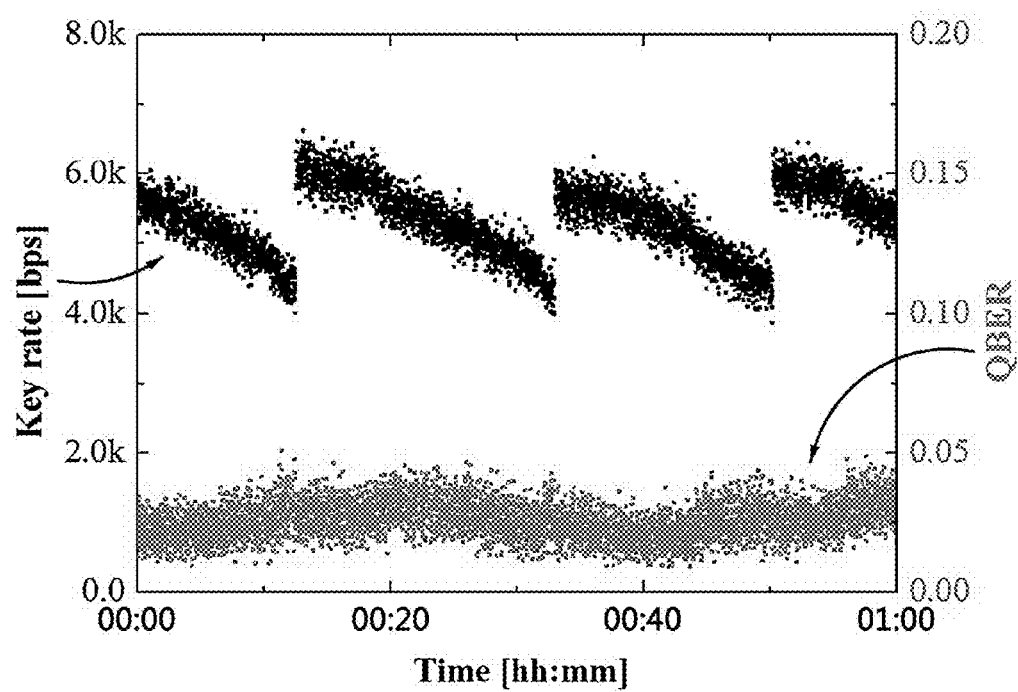
FIG. 10 shows results of controlling a bit error rate and a key rate in real time according to an embodiment.
Figure 11A:
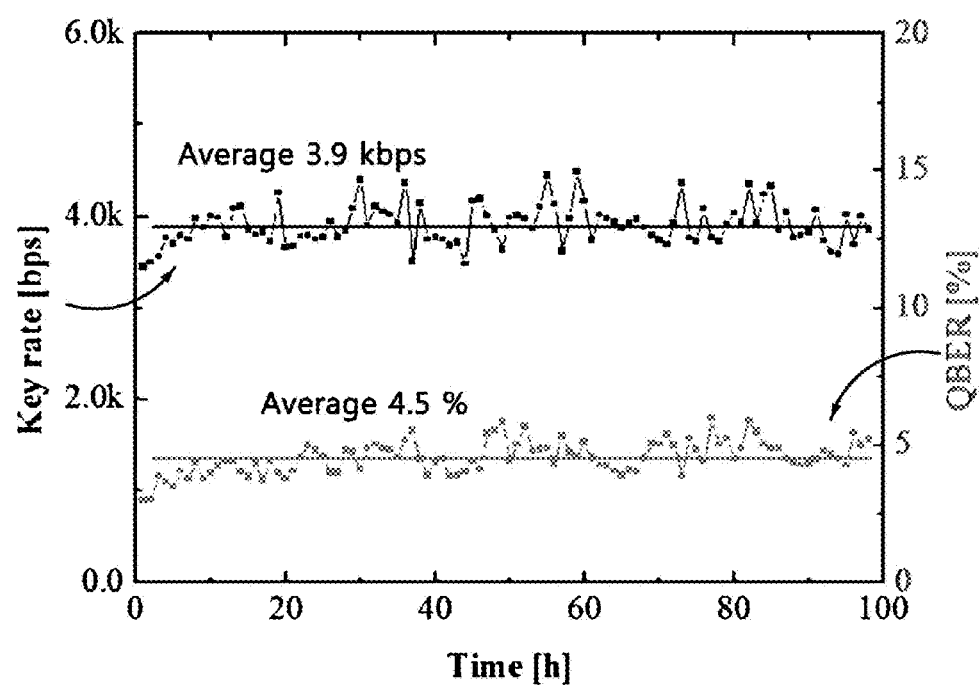
FIGS. 11A and 11B show results of controlling a quantum key distribution system for a long time (100 times) independently, with respect to a plurality of sending stations (a plurality of Alice).
Figure 11B:
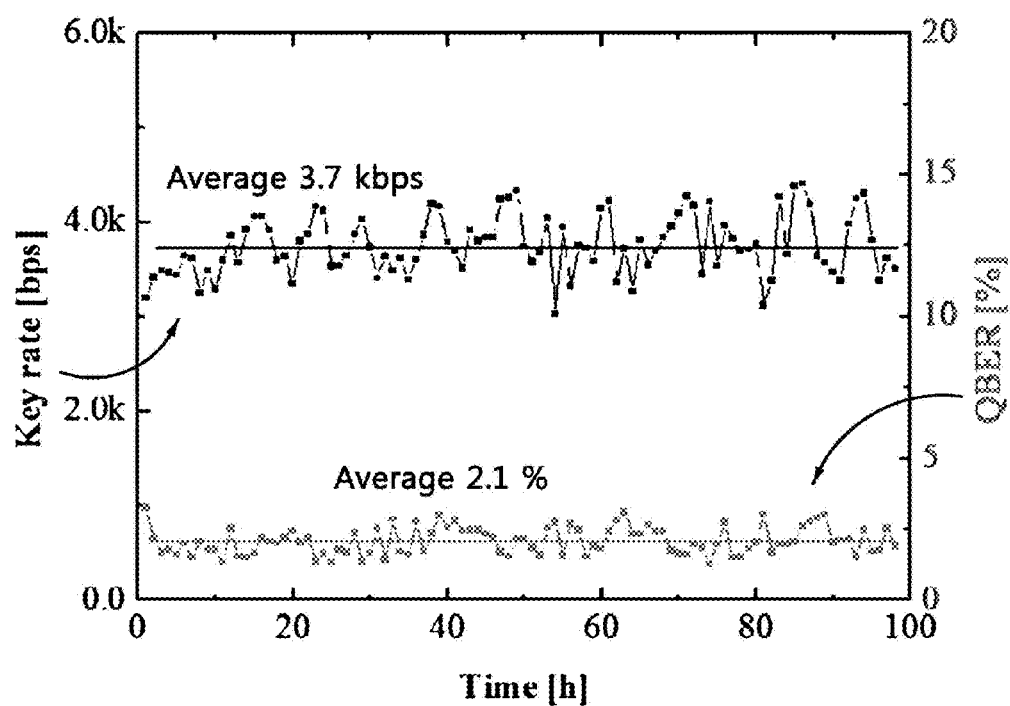

FIG. 10 shows results of controlling a bit error rate and a key rate in real time according to an embodiment. Also, FIGS. 11A and 11B show results of controlling a quantum key distribution system for a long time (100 times) independently, with respect to a plurality of sending stations (a plurality of Alice).

The method for stabilizing a quantum cryptography system as described above may be implemented as an application or program commands executable by various kinds of computer means and recorded on a computer-readable recording medium. The computer-readable recording medium may include program commands, data files, data structures or the like solely or in combination. The program commands recorded on the medium may be specially designed or configured for the present disclosure or known to and available by computer software engineers.

The computer-readable recording medium includes, for example, magnetic media such as a hard disk, a floppy disk and a magnetic tape, optical media such as CD-ROM and DVD, magneto-optical media such as a floptical disk, hardware devices such as ROM, RAM and a flash memory, specially configured to store and perform program commands, or the like. The program commands include not only machine codes made by a complier but also high-level language codes executable by a computer by using an interpreter. The hardware device may be configured to operate as at least one software module to perform the operations of the present disclosure, or vice versa.

In addition, even though the embodiments have been illustrated and explained, the present disclosure can be modified in various ways without departing from the scope of the claims by those having ordinary skill in the art, and such modifications must not be separately understood from the features of the present disclosure.

In addition, in the present disclosure, both a product invention and a process invention are described, and the explanations of both inventions may be supplementary to each other if necessary.

What is claimed is:

1. A method for stabilizing a quantum cryptography system, comprising:
    determining whether the quantum cryptography system operates in a stabilized state, based on a bit error rate or a key rate of the quantum cryptography system;
    readjusting a phase modulation value of a phase modulator so that every photon detector among photo detectors in the quantum cryptography system measures a single photon with a same probability; and
    in response to the quantum cryptography system not operating in the stabilized state,
    determining a reference arrival time of a gate pulse, within a first time range, in which a photon count measured at a photon detector is greater than or equal to a threshold count,
    determining an optimal arrival time of the gate pulse, within a second time range, in which the photon count measured at the photon detector is maximal, and
    readjusting the arrival time of the gate pulse so that an arrival time of a single photon for the photon detector is aligned with the arrival time of the gate pulse, based on the determined optimal arrival time of the gate pulse,
    wherein the optimal arrival time of the gate pulse is determined based on a result of comparing a photon count measured after the arrival time of the gate pulse is changed with a photon count measured before the arrival time of the gate pulse is changed, and
    wherein the readjusting of the phase modulation value occurs before the readjusting of the arrival time of the gate pulse.

2. The method for stabilizing the quantum cryptography system according to claim 1, wherein the second time range includes the reference arrival time of the gate pulse and is smaller than or equal to the first time range.

3. The method for stabilizing the quantum cryptography system according to claim 2, wherein
    the reference arrival time of the gate pulse is determined based on a photon count measured as the arrival time of the gate pulse is changed as much as a first time interval within the first time range,
    the optimal arrival time of the gate pulse is determined based on a photon count measured as the arrival time of the gate pulse is changed as much as a second time interval within the second time range, and
    the second time interval is less than or equal to the first time interval.

4. The method for stabilizing the quantum cryptography system according to claim 1, wherein the determining of whether the quantum cryptography system operates in the stabilized state comprises determining that the quantum cryptography system does not operate in the stabilized state, in response to the bit error rate being greater than or equal to a first threshold or the key rate being less than or equal to a second threshold.

5. The method for stabilizing the quantum cryptography system according to claim 1, wherein the determining of whether the quantum cryptography system operates in the stabilized state comprises determining whether the quantum cryptography system operates in the stabilized state based on the key rate of the quantum cryptography system, which is obtained after the phase modulation value is readjusted.

6. The method for stabilizing the quantum cryptography system according to claim 1, wherein the quantum cryptography system is a two-way quantum cryptography system.

7. The method of claim 1, wherein the reference arrival time of the gate pulse is determined by iteratively performing either one or both of leading and lagging the arrival time of the gate pulse by a first interval, until determining that the photon count measured at the photon detector is greater than or equal to the threshold count.

8. The method of claim 7, wherein the optimum arrival time of the gate pulse is determined by iteratively performing either one or both of leading and lagging the arrival time of the gate pulse by a second interval that is smaller than the first interval, until determining that the photon count measured at the photon detector is maximal.

9. An apparatus for stabilizing a quantum cryptography system, comprising:
    a hardware processor configured to:
    determine whether the quantum cryptography system operates in a stabilized state, based on a bit error rate or a key rate of the quantum cryptography system;
    readjust a phase modulation value of a phase modulator so that every photon detector among a plurality of photon detectors measures a single photon with a same probability; and
    in response to the quantum cryptography system not operating in the stabilized state,
    determine a reference arrival time of a gate pulse, within a first time range, in which a photon count measured at a photon detector is greater than or equal to a threshold count,
    determine an optimal arrival time of the gate pulse, within a second time range, in which the photon count measured at the photon detector is maximal, and
    readjust the arrival time of the gate pulse for the photon detector so that an arrival time of a single photon for the photon detector is aligned with the arrival time of the gate pulse, based on the determined optimal arrival time of the gate pulse,
    wherein the optimal arrival time of the gate pulse is determined based on a result of comparing a photon count measured after the arrival time of the gate pulse is changed with a photon count measured before the arrival time of the gate pulse is changed, and wherein the readjusting of the phase modulation value occurs before the readjusting of the arrival time of the gate pulse.

10. The apparatus for stabilizing the quantum cryptography system according to claim 9, wherein the second time range includes the reference arrival time of the gate pulse and is smaller than or equal to the first time range.

11. The apparatus for stabilizing the quantum cryptography system according to claim 10, wherein the hardware processor is further configured to:

determine the reference arrival time of the gate pulse based on a photon count measured as the arrival time of the gate pulse is changed as much as a first time interval within the first time range; and determine the optimal arrival time of the gate pulse based on a photon count measured as the arrival time of the gate pulse is changed as much as a second time interval within the second time range, the second time interval being smaller than or equal to the first time interval.

12. The apparatus for stabilizing the quantum cryptography system according to claim 9, wherein the hardware processor is further configured to determine that the quantum cryptography system does not operate in the stabilized state, in response to the bit error rate being greater than or equal to a first threshold or the key rate being less than or equal to second threshold.

13. The apparatus for stabilizing the quantum cryptography system according to claim 9, wherein the hardware processor is further configured to determine whether the quantum cryptography system operates in the stabilized state, based on the key rate of the quantum cryptography system, which is obtained after the phase modulation value is readjusted.

14. The apparatus for stabilizing the quantum cryptography system according to claim 9, wherein the quantum cryptography system is a two-way quantum cryptography system.

* * * * *